Oct. 9, 1962    H. H. KOLBE    3,057,588
FLUID STORAGE AND TRANSFER SYSTEM
Filed June 3, 1959
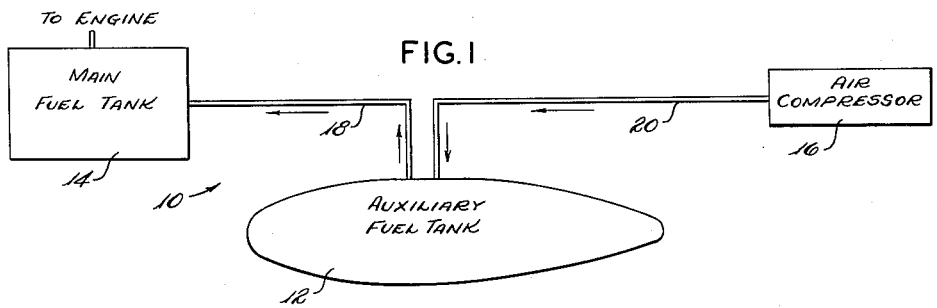
FIG. 1
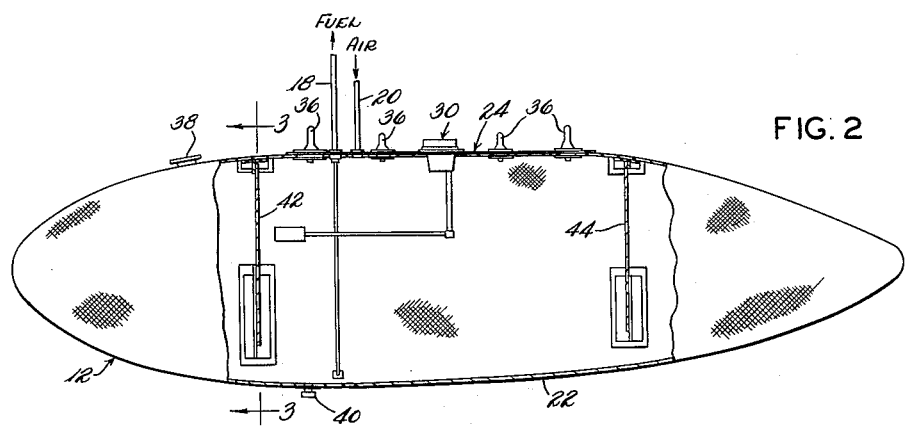
FIG. 2
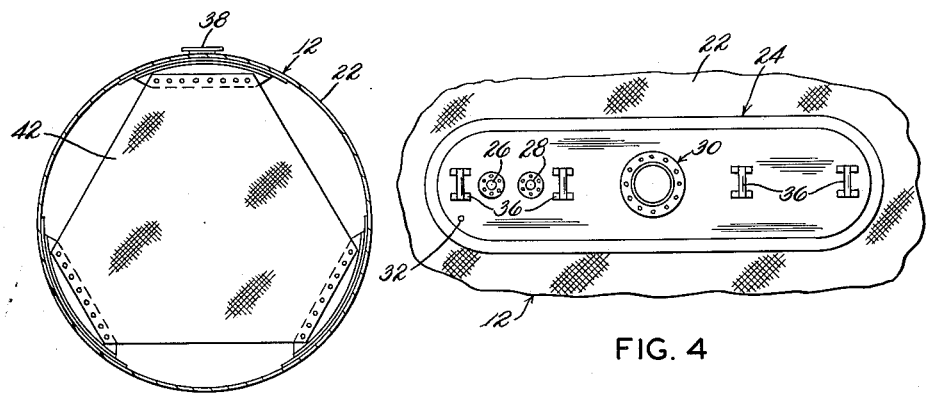
FIG. 3
FIG. 4

United States Patent Office 3,057,588
Patented Oct. 9, 1962

3,057,588
FLUID STORAGE AND TRANSFER SYSTEM
Henry H. Kolbe, Los Angeles, Calif., assignor to The Firestone Tire & Rubber Company, Akron, Ohio, a corporation of Ohio
Filed June 3, 1959, Ser. No. 817,923
2 Claims. (Cl. 244—135)

This invention relates to fluid storage and transfer systems and more particularly to such systems employing auxiliary, flexible, walled tanks.

On present day high speed vehicles it has been found necessary to install auxiliary fuel tanks to supplement main fuel tanks to allow such vehicles to travel greater distances without refueling. The auxiliary tanks are in many instances jettisoned from such vehicles when fuel has been exhausted.

It is obvious that the use of such auxiliary fuel tanks is costly, because they cannot be reused due to the damage incurred from impact with the ground when released from the vehicle.

Also, as the fuel transfer system is operating, it is important that fuel maintains a constant uniform rate of flow from the tanks to the engine. When a vehicle is subjected to violent directional changes, forces cause irregularity in fuel pressure which undesirably slows or stops fuel flow. Attempts to remedy this situation have been made by the use of fuel pumps without complete success, because the high speeds attained by present day vehicles exert forces against the fuel greater than can be overcome by the fuel pumps attempting to maintain a constant uniform rate of fuel flow.

The present invention overcomes the foregoing and other difficulties of the prior art by providing a novel fluid storage and transfer system including an auxiliary, flexible walled fuel tank which is releasably attached to a vehicle and which provides a constant flow of fuel to the engine of the vehicle. More specifically, this invention provides in a fluid system a flexible, auxiliary fuel tank which can be retrieved and reused after release from a vehicle, and is adapted to contain a body of gas under pressure upon the fuel to both support the flexible walls and to provide uniform fuel flow to the vehicle engine.

It is therefore an object of this invention to provide a fluid storage and transfer system including a novel, flexible walled auxiliary fuel tank.

It is also an object to provide a fluid storage and transfer system having an auxiliary, flexible walled fuel tank resistant to damage and reusable after being dropped from a vehicle, in combination with gas pressure means for maintaining uniform fluid flow in the system as well as providing support for the flexible walls of the tank.

Yet another object of the invention is to provide fuel transfer and storage means having in combination a flexible walled auxiliary tank releasably attached to said system and cooperating with gas pressure means for maintaining uniform fuel flow in the system as well as providing support for the walls of the tank.

These and other objects will become more apparent after reference to the following specification and drawings, in which:

FIGURE 1 is a diagrammatic view showing a vehicle fuel system in accordance with the invention.

FIGURE 2 is an enlarged elevation of the fuel tank of FIGURE 1 partially broken away and in section.

FIGURE 3 is a sectional view taken on line 3—3 of FIGURE 2.

FIGURE 4 is an enlarged plan view of the cover plate showing various fittings and mounting brackets.

Referring to FIGURE 1 of the drawing, a fuel supply and transfer system, generally indicated at 10, comprises an auxiliary flexible walled fuel tank 12, and main fuel tank 14 connected by a conduit 21, to the vehicle engine, and an air compressor 16. Tank 12 is connected to tank 14 by conduit 18 and to air compressor 16 by conduit 20. Tank 12 may be connected directly to the vehicle engine instead of to tank 14, if so desired.

Auxiliary fuel tank 12 is comprised of a flexible streamline body portion 22 preferably constructed of vulcanized rubberized fabric plies, having an opening closed by cover plate 24 mounting a conventional quick disconnect self-sealing fuel outlet fitting 26, and a quick disconnect air inlet fitting 28. Also carried by cover plate 24 is a fuel guage 30, a pressure relief valve 32, and brackets 36 to releasably secure tank 12 to a vehicle, such as an airplane. A filler cap 38 is provided for filling fuel tank 12, while a drain plug 40 at the bottom of body portion 22 provides for draining or cleaning the tank. Flexible baffles 42 and 44 are suitably secured within tank 12 to break up sloshing of fuel within tank 12 during operation of the vehicle.

In operation of the preferred form of the invention, the auxiliary tank 12 is attached, for example, to an aircraft by brackets 36. Conduits 18 and 20 are connected to the tank 12 by the fittings 26 and 28, respectively. Brackets 36 and fittings 26 and 28 are adapted for quick release from the aircraft. Tank 12 is filled with fuel through filler cap 38, and air is pumped into tank 12 by air compressor 16 to maintain steady fuel flow from the auxiliary tank 12 to the main tank 14, and to keep the flexible walls of the tank rigid at all times during operation of the aircraft. Upon exhaustion of fuel from the tank 12, that tank may be jettisoned from the aircraft to the ground. The undamaged tank can be retrieved and reused. Because tank 12 is of flexible construction without internal support, the tank is more resistant to damage from ground impact than a tank constructed of a rigid material.

Although air under pressure is used to maintain uniform fuel flow, other gases may be used. Also, a tank containing gas under pressure can be used in place of the compressor 16.

While one embodiment of the invention has been shown and described, it will be apparent that various modifications may occur to those skilled in the art without departing from the spirit and scope of the invention, the essential features of which are summarized in the appended claims.

I claim:

1. A fluid storage and transfer system for aircraft comprising a main fluid tank internal of said aircraft, a flexible-walled auxiliary fluid tank external of said aircraft and structurally unsupported against collapse, first fluid conduit means connected to said main fluid tank and adapted to conduct said fluid from said main fluid tank, second fluid conduit means connecting said auxiliary fluid tank to said main fluid tank, and pressure means exerting controlled pressure internally of said auxiliary fluid tank whereby fluid is transferred from said auxiliary fluid tank to said main fluid tank and whereby the walls of said auxiliary fluid tank are rigidly supported against collapse.

2. A fluid storage and transfer system for aircraft comprising in combination a flexible rubberized fabric fluid tank adapted for attachment external of said aircraft and having walls structurally unsupported against collapse, fluid conduit means connected to said tank and adapted to conduct fluid from said tank, and pressure means exerting controlled pressure internally of said fluid tank whereby fluid may be forced through said conduit means and whereby the walls of said fluid tank are rigidly supported against collapse.

References Cited in the file of this patent

UNITED STATES PATENTS

| | | |
|---|---|---|
| 2,369,921 | Shakesby | Feb. 20, 1945 |
| 2,381,402 | Weber | Aug. 7, 1945 |
| 2,552,119 | Scharenberg | May 8, 1951 |
| 2,612,216 | Samiran | Sept. 30, 1952 |
| 2,613,715 | Johnson | Oct. 14, 1952 |
| 2,700,517 | Stavely | Jan. 25, 1955 |
| 2,777,656 | Clifton | Jan. 15, 1957 |

FOREIGN PATENTS

| | | |
|---|---|---|
| 255,488 | Great Britain | Mar. 17, 1927 |
| 316,184 | Great Britain | July 18, 1929 |
| 402,943 | Italy | Mar. 30, 1943 |